United States Patent
McGrail et al.

(10) Patent No.: US 11,598,442 B2
(45) Date of Patent: Mar. 7, 2023

(54) CURRENT DEPENDENT BI-DIRECTIONAL FORCE SOLENOID

(71) Applicants: DENSO International America, Inc., Southfield, MI (US); DENSO CORPORATION, Kariya (JP)

(72) Inventors: Daniel McGrail, Southfield, MI (US); Michael Ozika, Novi, MI (US)

(73) Assignees: DENSO International America, Inc., Southfield, MI (US); DENSO CORPORATION, Kariya (JP)

(*) Notice: Subject to any disclaimer, the term of this patent is extended or adjusted under 35 U.S.C. 154(b) by 872 days.

(21) Appl. No.: 16/424,848

(22) Filed: May 29, 2019

(65) Prior Publication Data
US 2020/0378522 A1 Dec. 3, 2020

(51) Int. Cl.
*H01F 7/08* (2006.01)
*F16K 31/06* (2006.01)
*H01F 7/16* (2006.01)

(52) U.S. Cl.
CPC ...... *F16K 31/0613* (2013.01); *F16K 31/0675* (2013.01); *H01F 7/081* (2013.01); *H01F 7/1607* (2013.01)

(58) Field of Classification Search
CPC .............................. H01F 7/1607; H01F 7/081
USPC ........................................................ 335/281
See application file for complete search history.

(56) References Cited

U.S. PATENT DOCUMENTS

| | | | | |
|---|---|---|---|---|
| 3,241,005 A * | 3/1966 | Morris, Jr. | ............ | H01F 7/1607 335/262 |
| 3,378,732 A * | 4/1968 | Dietz | .................... | H01F 7/1607 361/194 |
| 3,683,239 A | 8/1972 | Sturman | | |
| 5,114,116 A * | 5/1992 | Muller | .................. | B60T 15/028 251/129.21 |
| 5,655,746 A * | 8/1997 | Goubely | ............. | F16K 31/0658 251/129.21 |
| 6,489,870 B1 | 12/2002 | Ward et al. | | |
| 6,788,177 B1 | 9/2004 | Weber | | |
| 6,791,442 B1 | 9/2004 | Schmidt | | |
| 6,856,221 B1 | 2/2005 | Zehrung | | |
| 7,007,527 B1 | 3/2006 | Zehrung | | |
| 7,036,525 B2 * | 5/2006 | Ichinose | ............. | F16K 31/0637 137/596.17 |
| 7,481,242 B2 * | 1/2009 | Golovatai-Schmidt | ..................... | F16K 31/0637 137/625.65 |
| 8,272,622 B2 * | 9/2012 | Caldwell | ............... | H01F 7/1646 251/129.01 |

(Continued)

*Primary Examiner* — Alexander Talpalatski
(74) *Attorney, Agent, or Firm* — Harness, Dickey & Pierce, P.L.C.

(57) ABSTRACT

A solenoid valve having current dependent bi-directional force includes a stator with a channel. An armature is in the stator channel. The armature is movable in a first and second direction. A projection extends from the stator into the channel. When a low current is applied, a flux is generated such that it jumps from the projection to the armature and back to the stator. Thus, the armature is pulled in the first direction. As the current is increased, the projection becomes magnetically saturated and the additional flux as a result of increased current jumps from the stator, at a thinned portion, to the armature then back to the stator. This moves the armature in the second direction, opposite to the first direction.

3 Claims, 5 Drawing Sheets

(56) References Cited

U.S. PATENT DOCUMENTS

| | | | | |
|---|---|---|---|---|
| 9,033,309 B2* | 5/2015 | Rampen | ............... | F16K 31/082 335/304 |
| 9,423,045 B2* | 8/2016 | Mills | .................... | F16K 27/048 |
| 9,601,252 B2* | 3/2017 | Irie | ........................ | H01F 7/127 |
| 2002/0175569 A1* | 11/2002 | Komiyama | ............... | H01F 7/13 310/12.26 |
| 2011/0253918 A1 | 10/2011 | Rampen et al. | | |
| 2014/0026836 A1 | 1/2014 | Matsumoto et al. | | |

\* cited by examiner

CURRENT DEPENDENT BI-DIRECTIONAL FORCE SOLENOID

FIELD

The present disclosure relates to solenoid valves, and more particularly, to a current dependent bi-directional force applied to the solenoid.

BACKGROUND

Solenoid valves usually require a spring capable of returning the armature to a home position when the solenoid is deenergized. The spring force is chosen to be strong enough to ensure that the armature can return to the home position when the solenoid is deenergized. Additionally, the spring in a solenoid valve may be designed to provide additional holding force to ensure the valve remains in the home position when it is deenergized. In the event that the solenoid valve is subject to external forces, such as vibration or pressure differentials across the valve, this would tend to unseat the armature. Due to these external forces, a stronger force spring is usually used. This requires a stronger and larger solenoid to open the valve and overcome the spring force. Alternatively, it is conceivable that it may be desirable for an armature to stay in a closed position even when some current is applied. Such delay in the armature movement is desired until current exceeds a threshold.

The disclosure provides a solution to reduce or eliminate the extra spring force that is necessary to ensure the valve remains seated when external forces are present. Thus, the disclosure enables a smaller force solenoid to be used. This is accomplished by designing the stator core in such a way that it applies a net magnetic force to the armature in the same direction as the spring force when a low current is applied to the coil. The disclosure can also be used to delay the movement of the armature/plunger until a current threshold is exceeded. This is accomplished in the same manner, by designing the stator core in such a way that it applies a net magnetic force to the armature in the same direction as the spring force until current is increased to a threshold level. Thus, at this point, the magnetic force pulling the plunger in the direction of spring compression exceeds the magnetic force pulling the plunger in the direction of spring extension, resulting in the plunger moving from home position to a stroked position.

The disclosure provides a solenoid with a magnetic circuit design where a path of low reluctance holds an armature in a home position when a low current is applied to the coil. This low reluctance path may be made by many different geometrical protrusions extending from the stator core. Additionally, this protrusion may be a separate piece from the stator core altogether. At high current, the low reluctance path becomes magnetically saturated, greatly increases in reluctance, so that the additional flux from the high current bypasses the protrusion. Thus, the armature is pulled in the opposite direction due to the existence of a lower reluctance path. Accordingly, it is possible to change the direction of the net force on the armature by varying the current magnitude only.

SUMMARY

According to the disclosure, a solenoid valve having current dependent bi-direction forces comprises a stator with a channel. An armature is positioned in the stator channel. The armature is movable in a first and second direction in the channel. A projection extends from the stator into the channel. When the plunger is in its de-energized home position and a low current is applied, a flux is generated such that it jumps from the projection to the axial face of the armature back to the stator (on the far side of the thinned portion) so that the net magnetic force pulls the armature in the first direction. As the current increases, the projection becomes magnetically saturated. Additional flux generated by the increased current bypasses the magnetically saturated projection, and jumps from the stator, radially at a thinned portion, to the armature then back to the stator on the far side of the thinned portion, producing a force in the second direction that exceeds that of the first direction, and thus produces a net force in the second direction; moving the armature in a second direction, opposite to the first direction. The projection may have an overall wedge shape or a bump shape. The wedge generally extends from a sidewall of the stator channel. The bump generally extends from a base of the channel. In the first direction, the direction is in the direction of the spring force. The second direction is opposite to the spring force.

In other features of the present disclosure, a system is provided and includes a solenoid valve having a stator, an armature, and a coil. The stator includes a yoke with at least one aperture to receive the coil and with a channel that receives the armature and a return spring. The return spring applies a biasing force to the armature in a first direction away from a base of the channel. The stator has a projection that extends from the stator into the channel. The solenoid valve is configured such that when a first current is applied to the coil, a flux is generated and jumps from the projection to the armature and back to the stator, thereby applying a first force to the armature in the first direction. The first force moves the armature in the first direction away from the base of the channel. When a second current is applied to the coil, the second current being greater than the first current, the projection becomes magnetically saturated and an additional flux resulting from the second current jumps from the stator, at a thin walled portion of the stator, to the armature and back to the stator, thereby applying a second force to the armature in a second direction opposite to the first direction. The second force is greater than the first force and the biasing force of the return spring. The second force moves the armature towards the base of the channel.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
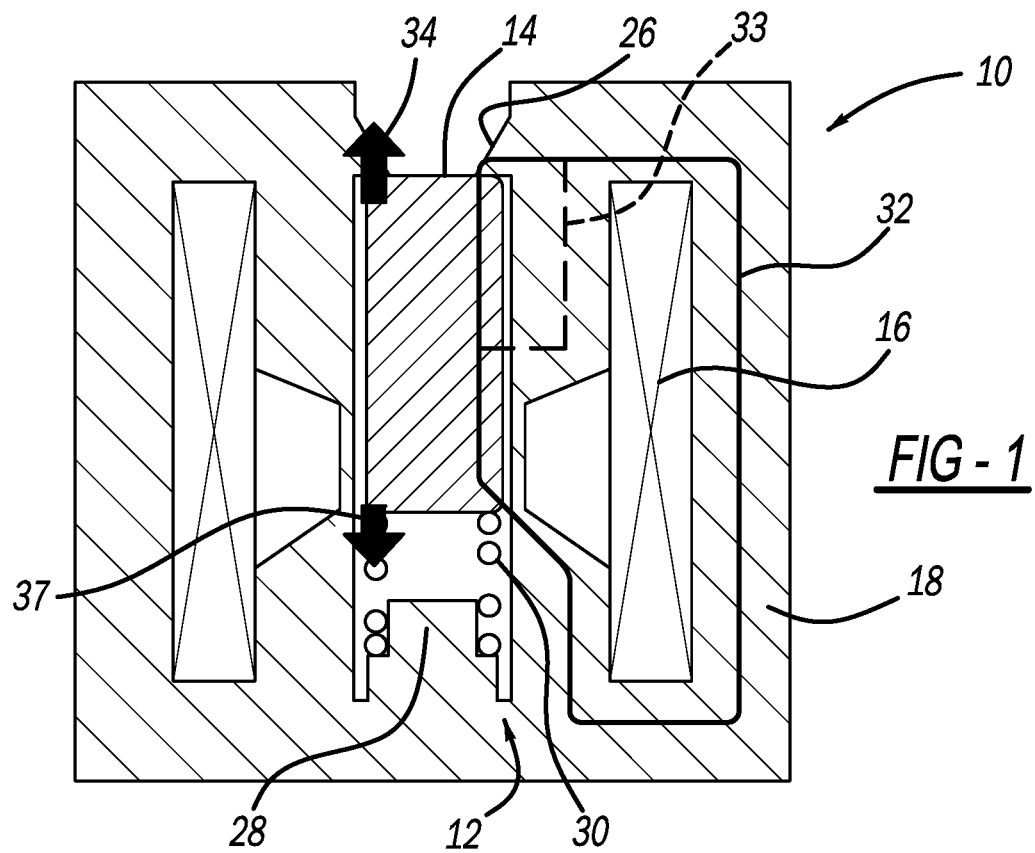
FIG. 1 is a schematic view of a solenoid in accordance with the disclosure in a low current or high current situation before the armature has moved away from its home position.
Figure 2:
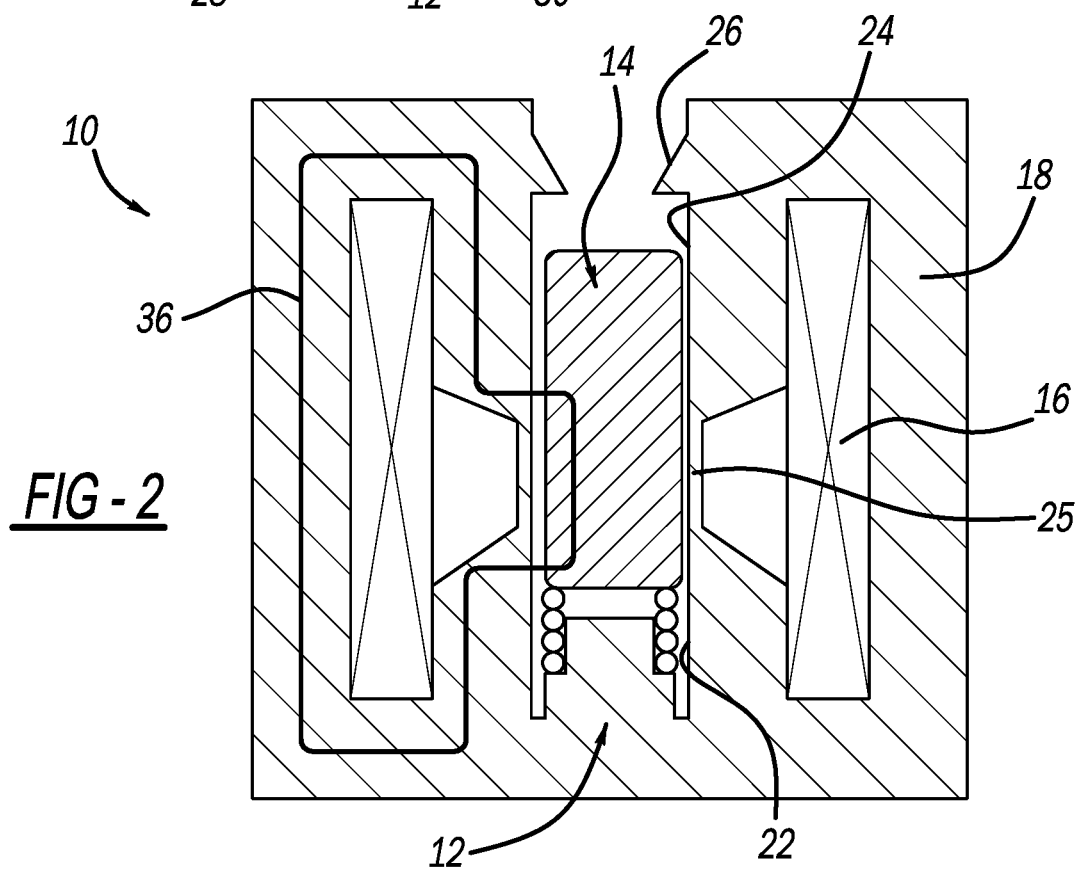
FIG. 2 is a view like FIG. 1 in a low current or high current situation away from the home position.

Turning to FIGS. 1 and 2, a solenoid is illustrated and designated with the reference numeral 10. The solenoid includes a stator core 12, an armature 14 and a coil 16. The stator core 12 is manufactured in known methods. The stator core 12 includes a yoke 18 that includes apertures to receive the coil 16. Also, the yoke includes a channel 22 that receives the armature 14.

The channel 22 is defined by a sidewall 24 that includes a thin portion 25 (alternatively, the thin portion 25 may be omitted such that the stator core is divided into two separate pieces) to channel flux into the armature 14. Additionally, a projection 26 extends from the stator core 12 into the channel 22. The projection 26 may have an overall wedge shape and extend into the channel 22 a desired distance. The stator core 12, projection 26, yoke 18 and armature 14 are manufactured from ferromagnetic material.

The stator channel 22 includes a base 28 that receives the return spring 30. The return spring 30 biases the armature or plunger 14 in a deenergized state.

Turning to FIG. 1, as illustrated by the low current flux path 32, as a low current is provided by the coil, the flux path 32 passes through the protrusion 26, jumps to the armature 14 and then exits the armature 14 past the thin walled portion 25. At a low current, the armature 14 is drawn in a direction away from the base 28 as illustrated by the arrow 34. This applies the force in the same direction as the spring force. This enables a valve to remain in a home position when the solenoid is energized. Thus, a smaller solenoid and lower force spring may be utilized.

When the current is increased, the flux path 32 magnetically saturates the projection 26. This causes the additional flux that results from the increased current to bypass the projection 26, as shown by flux line 33. This additional flux enters the armature 14 radially, then together with flux line 32, exits the bottom of the armature, generating net magnetic force 37 in the direction of the base 28. As the armature 14 moves away from and remains a sufficient distance from projection 26, the primary flux path 36 is like that illustrated in FIG. 2. Here, the lowest reluctance path is adjacent the thin walled portion 25 and the flux causes the armature 14 to move towards the base 28 against the spring force. Thus, the armature 14 acts like that of a normal solenoid.

Thus, depending upon the magnitude of the current applied to the coil 16, the armature 14 can move in a first or second direction when the armature 14 is in the home position, but will move unidirectionally when current is applied if the armature 14 is away from the home position. Accordingly, this can eliminate extra spring force that is required to ensure that the valve would remain seated when external forces are present and the coil is deenergized. Once the current magnitude exceeds a threshold value, the magnetic force is applied in the opposite direction of the spring to move the armature in the opposite or second direction.

Figure 5:
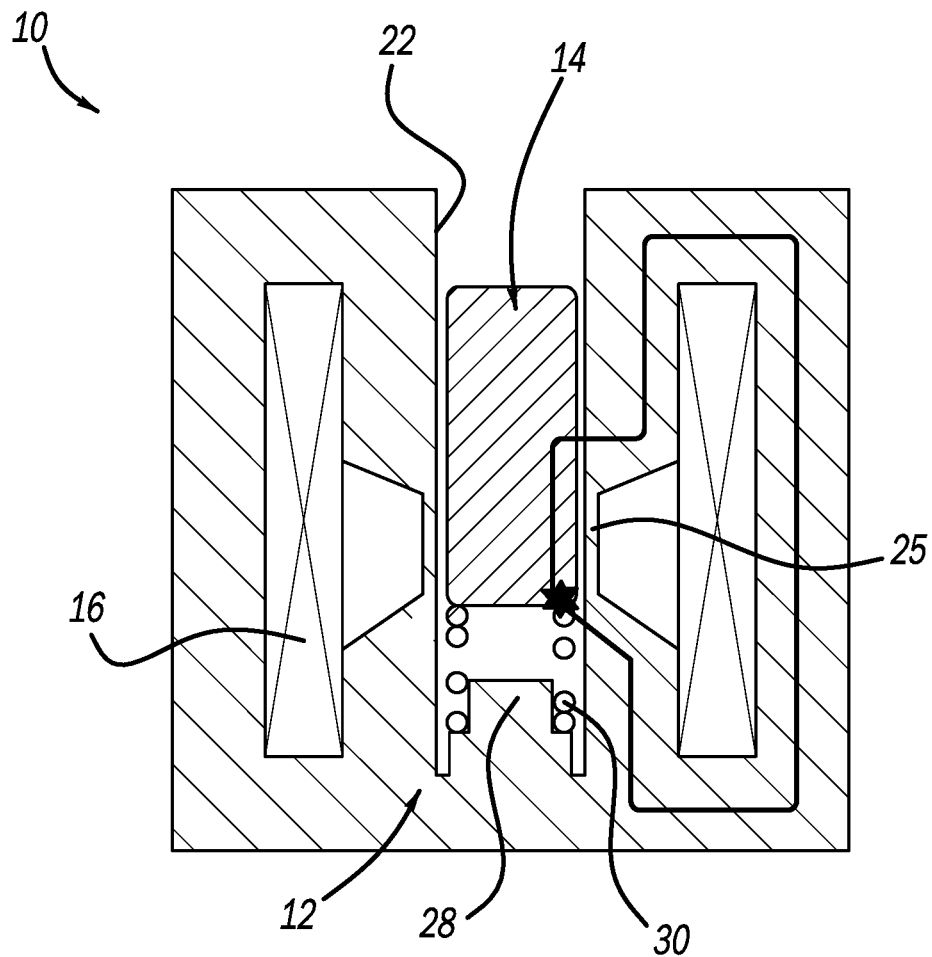
FIG. 5 is a schematic view of a prior art solenoid.

Turning to FIG. 5, a prior art solenoid is illustrated. As can be seen, the solenoid lacks a protrusion. Thus, as seen, as current is applied, the thin wall is saturated quickly which forces flux radially into the armature. The flux which leaves the axial face of the armature will generate an axial force on the armature in the direction of the base 28. The flux will then enter back into the stator core past the thin walled portion 25.

Figure 3:
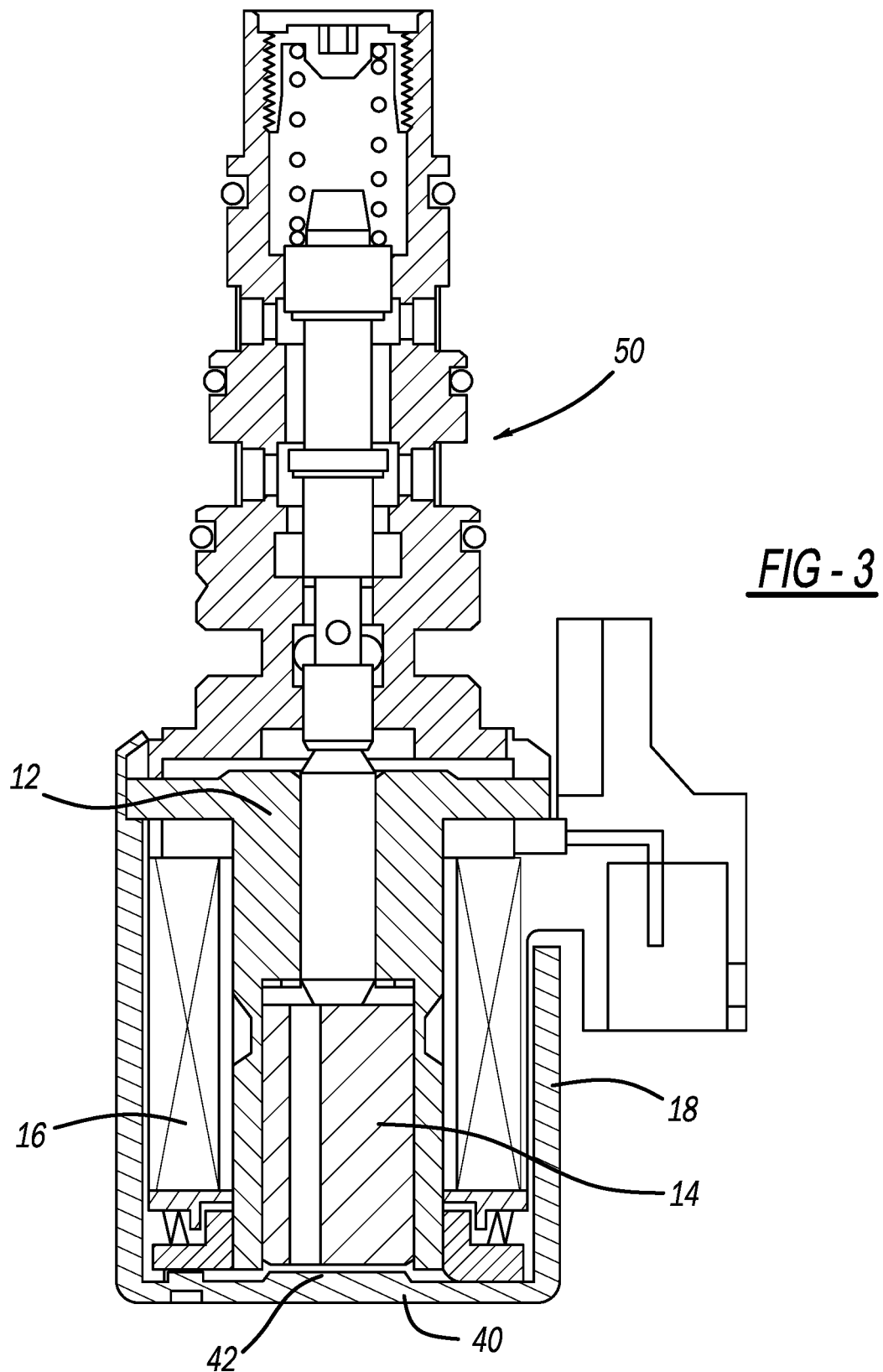
FIG. 3 is an additional embodiment of the solenoid in a low current or high current situation before the armature has moved away from its home position.

Turning to FIG. 3, an additional embodiment is illustrated. Here, the reference numerals that relate to the same or similar elements are designated with the same reference numerals.

Figure 4:
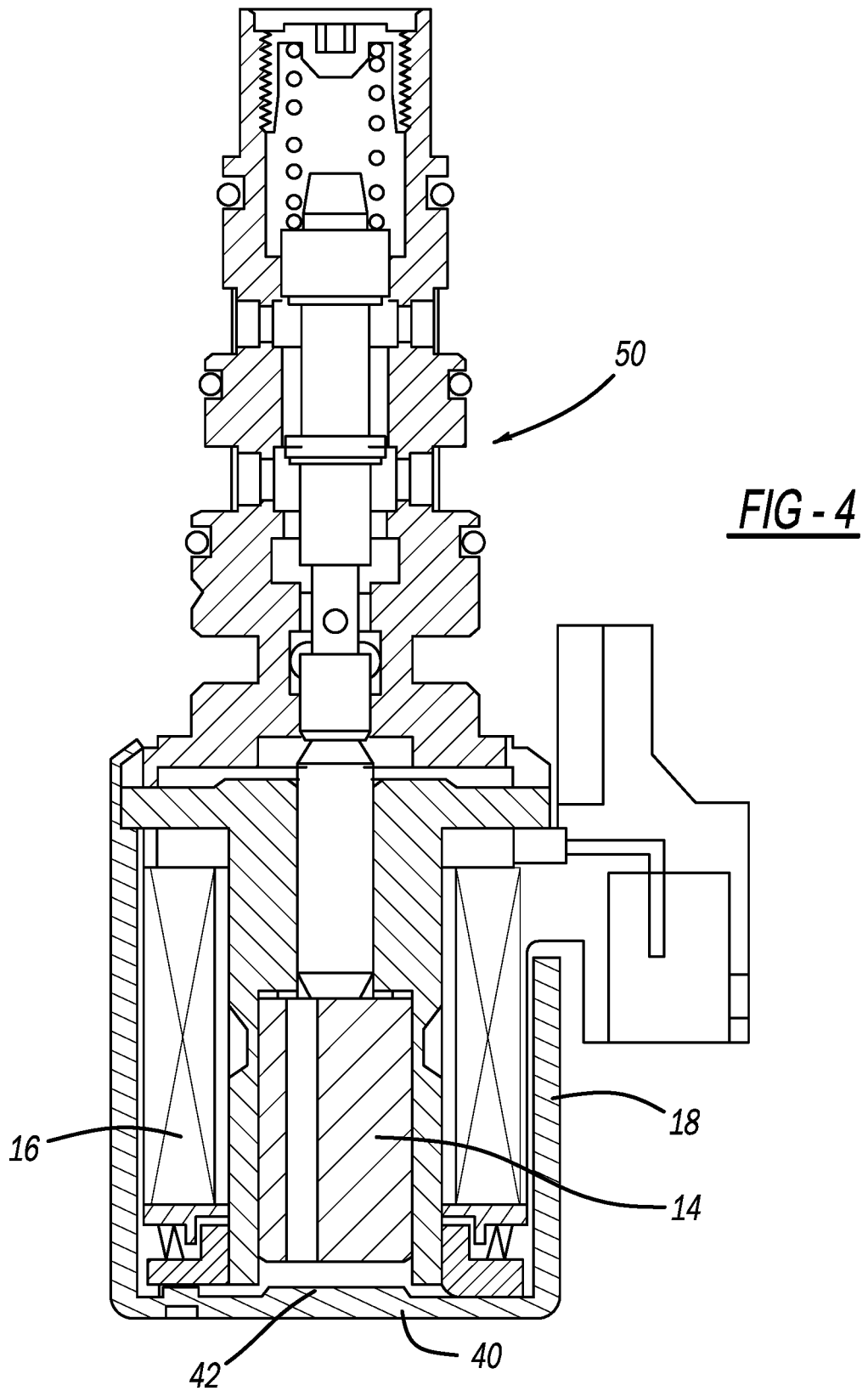
FIG. 4 is a view like FIG. 3 in a low current or high current situation away from the home position.

The web 40 of yoke 18 includes a bump 42 of ferromagnetic material extending into the channel from the web. At low current, magnetic flux will pass from the bump 42 into the bottom surface of the armature 14. This will pull the armature 14 down, in the same direction as the spring force. As the current is increased, the bump 42 becomes magnetically saturated so that the additional flux generated by the increased current bypasses this region. As this occurs, the armature 14 is pulled in the second or opposite direction (FIG. 4). Also, the solenoid 10 includes a conventional hydraulic portion 50.

Figure 6:
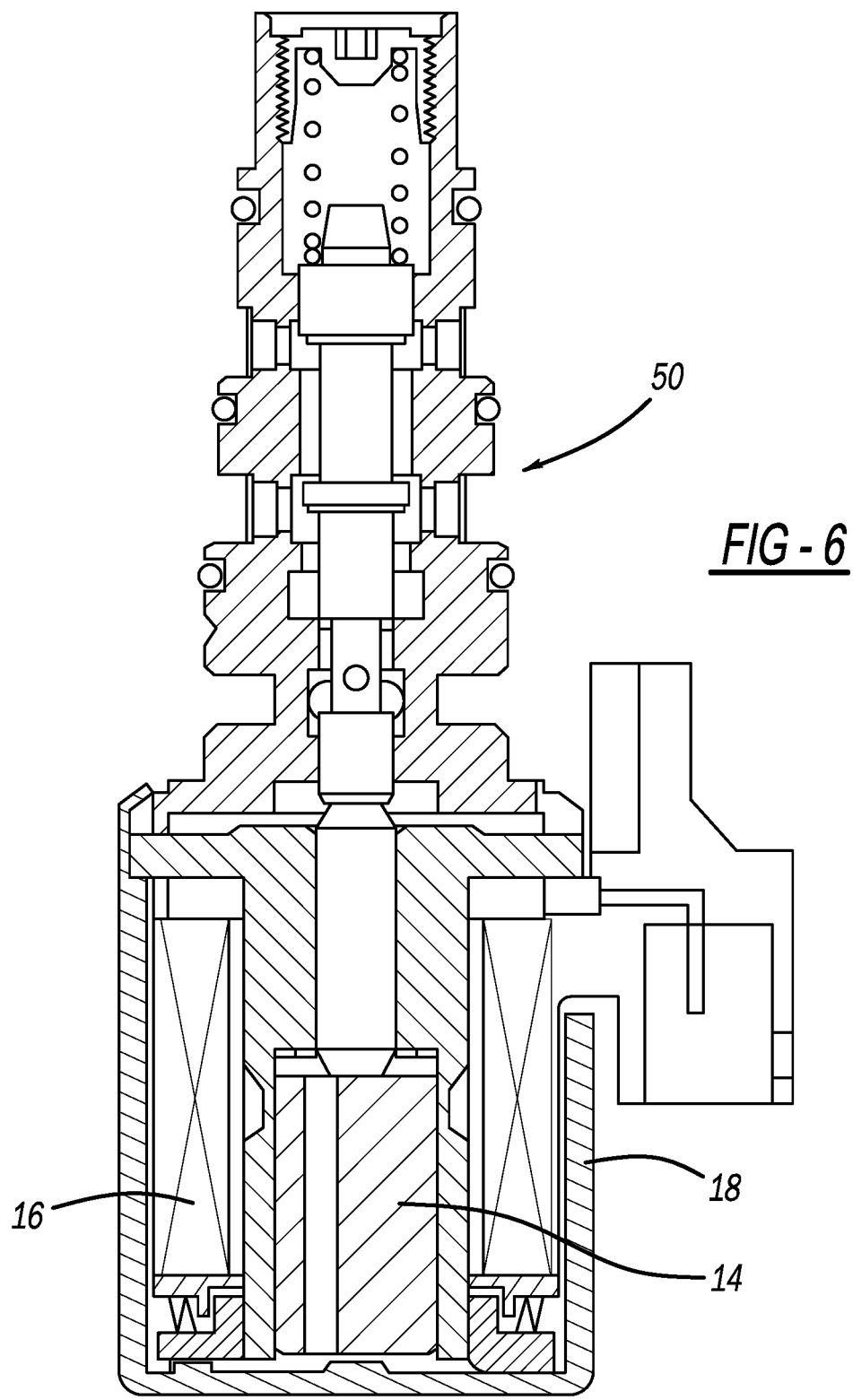
FIG. 6 is a schematic view of a prior art solenoid

FIG. 6 illustrates a prior art design wherein a narrow bump 42 exists below the armature 14. This narrow bump 42 saturates very easily, even at low current, so net magnetic force is always away from the bump 42.

The present teachings include a solenoid valve having current dependent bi-directional force comprising a stator with a channel, an armature in the stator channel, the armature movable in a first and second direction, and a projection that extends from the stator into the channel. When a low current is applied, a flux is generated such that it jumps from the projection to the armature and back to the stator so that the armature moves in the first direction. As the current is increased, the projection becomes saturated and additional flux as a result of the increased current jumps from the stator, at a thinned portion, to the armature then back to the stator, making a force on the armature in the second direction greater than a force on the armature in the first direction, thus moving the armature in the second direction, opposite to the first direction.

In accordance with the present teachings, the projection can have an overall wedge shape.

In accordance with the present teachings, the wedge shape of the projection can extend from a side wall of the channel.

In accordance with the present teachings, the projection can be a bump.

In accordance with the present teachings, the bump can extend from a base of the channel.

In accordance with the present teachings, the first direction can be in a direction with a spring force.

In accordance with the present teachings, the second direction can oppose the spring force.

In other features, the present teachings include a solenoid valve having current dependent bi-directional force comprising a stator with a channel and an armature in the stator channel. The armature movable in a first and second direction. When a low current is applied, a flux is generated such that it jumps from a stator portion to the armature and back to the stator so that the armature moves in the first direction, and as the current is increased, the stator portion at a location of the jump becomes saturated and additional flux as a result of the increased current jumps from the stator, at a thinned portion, to the armature then back to the stator, making a force on the armature in the second direction greater than a force on the armature in the first direction, thus moving the armature in the second direction, opposite to the first direction.

In accordance with the present teachings, the stator portion at the location of the jump can include a projection.

In accordance with the present teachings, the projection can have an overall wedge shape.

In accordance with the present teachings, the wedge shape of the projection can extend from a side wall of the channel.

In accordance with the present teachings, the stator portion at the location of the jump can include a bump.

In accordance with the present teachings, the bump can extend from a base of the channel.

In accordance with the present teachings, the first direction is in a direction with a spring force.

In accordance with the present teachings, the second direction opposes the spring force.

In other features, the present teachings include a system comprising a solenoid valve having a stator, an armature, and a coil. The stator includes a yoke with at least one aperture to receive the coil and with a channel that receives the armature and a return spring. The return spring applies a biasing force to the armature in a first direction away from a base of the channel. The stator has a projection that extends from the stator into the channel. The solenoid valve is configured such that when a first current is applied to the coil, a flux is generated and jumps from the projection to the armature and back to the stator, thereby applying a first force to the armature in the first direction. The first force moves the armature in the first direction away from the base of the channel. The solenoid valve is further configured such that when a second current is applied to the coil, the second current being greater than the first current, the projection becomes magnetically saturated and an additional flux resulting from the second current jumps from the stator, at a thin walled portion of the stator, to the armature and back to the stator, thereby applying a second force to the armature in a second direction opposite to the first direction. The second force is greater than the first force and the biasing force of the return spring. The second force moves the armature towards the base of the channel.

In accordance with the present teachings, the projection can have a wedge shape.

In accordance with the present teachings, the projection can extend from a side wall of the channel.

In accordance with the present teachings, the projection can extend from the base of the channel.

In accordance with the present teachings, the thin walled portion of the stator can be located in a side wall of the channel between the armature and the coil and at a location in the side wall of the channel that is closer to the return spring than the projection.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A solenoid valve having current dependent bi-directional force comprising:
    a stator having a base and a channel defined by a sidewall that includes a thinned portion;
    a coil;
    an armature received by and located in the channel;
    a return spring received by the base of the channel and that biases the armature in a first direction parallel with the sidewall and away from the base; and
    a projection that extends from the sidewall of the stator into the channel on an opposite side of the armature from the base;
    wherein:
    when a first current is applied to the coil, a first flux path is generated that extends from the projection, to the armature, past the thinned portion, and back to the stator, the first flux path generating a first force on the armature in a first direction;
    when a second current is applied to the coil, the projection becomes saturated and a second flux path is generated that extends from the sidewall, to the armature, past the thinned portion, and back to the stator, the second flux path generating a second force on the armature in a second direction, opposite to the first direction, causing the armature to move towards the base and away from the projection; and
    the second current is greater than the first current.

2. The solenoid valve of claim 1, wherein the projection has an overall wedge shape.

3. The solenoid valve of claim 1, wherein the projection is a bump.

* * * * *